INVENTOR:
Ottmar Vinz

United States Patent Office 3,426,256
Patented Feb. 4, 1969

3,426,256
TUBULAR CONDENSER OF VARIABLE CAPACITY
Ottmar Vinz, Landshut, Germany, assignor to Jenaer Glaswerk Schott & Gen., Mainz, Germany, a corporation of Germany
Continuation of application Ser. No. 561,521, June 29, 1966. This application Dec. 14, 1967, Ser. No. 690,685
Claims priority, application Germany, July 14, 1965, J 28,576
U.S. Cl. 317—249     3 Claims
Int. Cl. H01g 5/00; F16h 1/20

ABSTRACT OF THE DISCLOSURE

A tubular condenser of variable capacity comprising a tubular dielectric member on the outer periphery of which a stationary electrode is arranged, while an inner electrode consisting of a conductive tubular member is slidable along the inner periphery of the tubular dielectric member and forms a slidable electrical connection with a fixed tubular conductive member extending axially into the inner conductive tubular member. This electrical connection comprises a plurality of contact tongues on one of said tubular conductive members engaging axial grooves in the other one of said tubular conductive members.

---

This application is a continuation of Ser. No. 561,521, filed June 29, 1966, now abandoned.

The invention relates to a tubular condenser of variable capacity in which a stationary electrode arranged on the outer periphery of a tubular member is positioned opposite a slidable electrode in the interior of the tubular member. The slidable electrode is constructed in the form of a piston which is adjustable in axial direction by means of a spindle. Such type of condensers, among other uses, are also employed in the UHF range.

Condensers of this type have become known which were constructed as ceramic or glass tube trimmers. Condensers of this type are also utilized in which the dielectric consists of an organic substance.

These trimmer condensers are used for frequencies below about 100 mc./s. substantially for the fine adjustment of circuits, in which case they are connected in parallel with a condenser of substantially greater capacity. With higher frequencies, especially above 100 mc./s., these trimmer condensers serve directly for the construction of the circuits, and in such a case, they serve exclusively in an oscillatory circuit capacity. These condensers are also used for the resonance compensation of geometrically constructed oscillating systems, such as oscillating chambers, coaxial resonance lines, etc. Particularly when employed in the last-mentioned field, the requirements on the condenser are particularly high, particularly as regards to its loss tangent since the leakage increases in proportion of the operating frequently and again with these higher frequencies, frequently special requirements with respect to the sharpness of resonance and therewith the circuit efficiency are to be met.

In order to comply with these requirements, particularly with respect to a small loss tangent, one was previously of the opinion that for this property the loss relation the type of dielectric used is of decisive importance.

It was discovered, however, that also other factors do influence appreciably the losses. The object of the present invention is, therefore, to decrease further the losses occurring independently of the material of the dielectric.

The invention consists therefore of a tubular condenser of variable capacity, in which a stationary electrode arranged on the outer periphery of a tubular member is disposed opposite a slidable electrode in the interior of the tubular member, whereby the slidable electrode has the form of an adjustable piston on a spindle which is slidably supported in axial direction in a flange, and that for the electrical connection of flange and piston mechanical slidable contact members are provided.

It was discovered that when employing the means of the invention the total loss tangent tg δ will be appreciably reduced.

The invention will be explained more fully with reference to the accompanying drawing, in which FIG. 1 shows a tubular trimmer condenser of ordinary construction in axial section;

Figure 1:
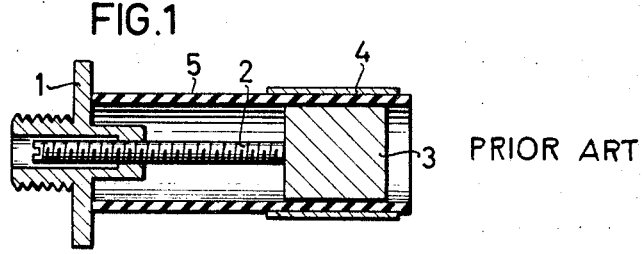

FIG. 1 illustrates a trimmer condenser of the prior art which is provided with a mounting flange 1 through the center of which extends axially adjustable a threaded spindle 2, which carries at its inner end a piston 3. As dielectric serves a tubular member 5 which slidably surrounds the piston 3 and which may be produced of multicomponents of glasses or of quartz glass. An exterior electrode 4 is fixedly attached to the outer periphery of the tubular member 5.

Figure 2:
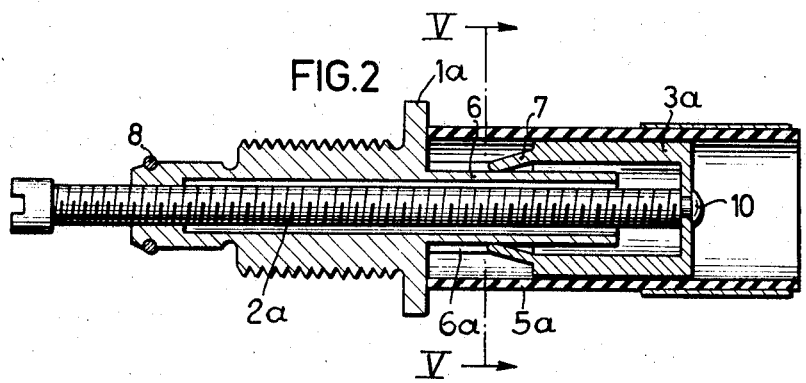
FIGS. 2, 3 and 4 show each by way of example a different embodiment of tubular condensers in accordance with the invention.

FIG. 2 illustrates diagrammatically an embodiment of the variable condenser in accordance with the invention. It differs from the prior art condenser of FIG. 1 in that the mounting flange 1a has fixed thereon a contact sleeve 6 which projects into the interior of the tubular member 5a, whereby on the outer periphery of this contact sleeve 6 is slidably disposed a cup-like piston 3a provided with contact tongues 7 engaging axial slots 6a in the sleeve 6. The bottom of the piston 3a is attached at 10 to the threaded spindle 2a.

Figure 3:
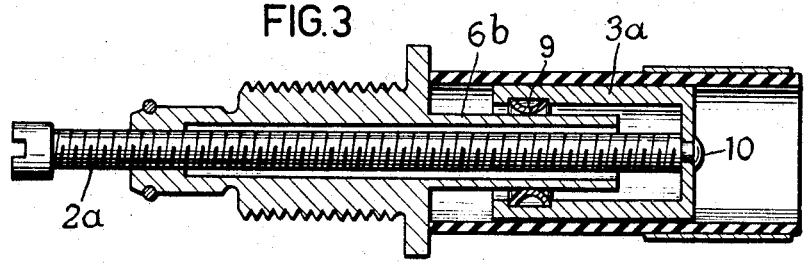

In the embodiment of the invention shown in FIG. 3, the cup-like piston 3a is provided with curved leaf springs 9 serving as slidable contact members which engage the outer surface of the contact sleeve 6b.

Figure 4:
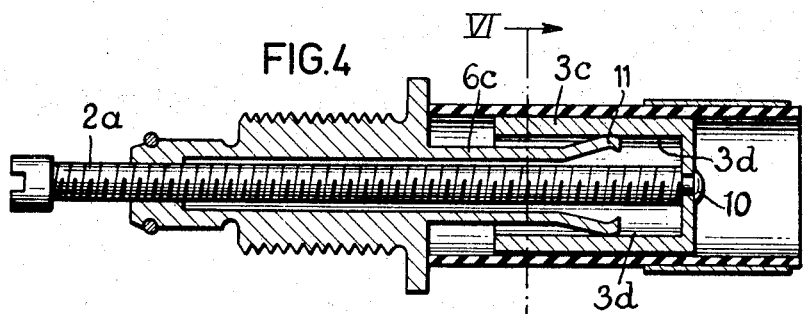
Figure 5:
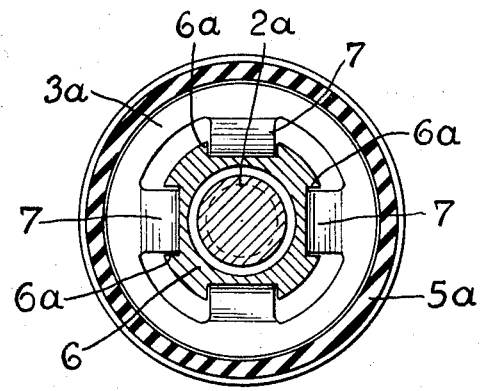
FIG. 5 is a cross-sectional view along the line V—V of FIG. 2.
Figure 6:
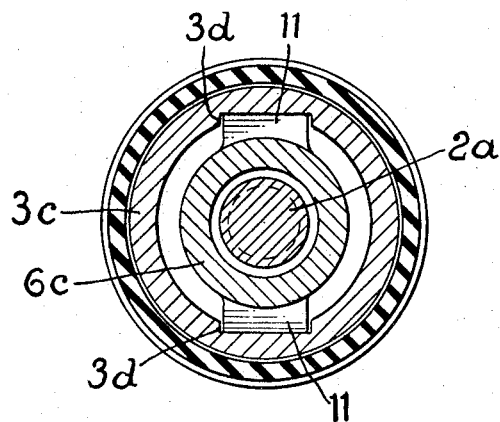
FIG. 6 is a cross-sectional view along the line VI—VI of FIG. 4.

In the embodiment according to FIG. 4, the inner end of the contact sleeve 6c is provided with outwardly extending resilient contact tongues 11 which slidably and resiliently engage axially extending grooves 3d in the inner wall of the cup-like piston 3c.

Upon a suitable selection of the strength of the resiliency of the slidable contacts, the latter may make an additional spindle locking device 8 as shown in FIG. 2 unnecessary.

The invention provides a good contact between the piston and the sleeve in such manner that a rotation of the piston caused by a rotation of the spindle is prevented by the contact tongues which slide in axial grooves (FIGS. 2 and 4) which resist a rotation of the piston. An axial slidable movement of the piston, without a rotation of the latter, has the advantage over a rotatable piston that the deviations occurring ordinarily in a linear tuning characteristic, on account of unavoidable lack of circular shape of piston, and the dielectric tubular member are prevented.

The decrease in the losses or leakage becomes apparent from the following example:

If the silver-plated spindle 2a in FIG. 2 of 20 mm. length and having an M 2.6 x 0.35 serving as current conducting part is now replaced by a silver-plated tubular contact sleeve 6 as current conducting part having the same length and having an outer diameter of 4 mm., then the lead-in resistance is lowered at 1 gHz. (disregarding the transition resistances) from 43 milliohm (mΩ) in the case of the spindle to now 13 milliohm (mΩ). At a capacity of 5 pf., this leads to a lowering of the series losses —which are superimposed additively to the parallel losses caused by the dielectrics—from $tg = 13 \cdot 10^{-4}$ to $tg = 4 \cdot 10^{-4}$.

What I claim is:

1. A tubular condenser of variable capacity, comprising a tubular member of a dielectric material, a stationary electrode on the outer periphery of said tubular member, an axially slidable tubular contact member within said tubular member and engaging the inner wall thereof and forming a slidable electrode disposed opposite said stationary electrode, said tubular contact member being open at one end and closed at its other end by a transverse wall, a mounting flange carrying on one of its faces said tubular member and being integrally formed with a fixed tubular contact member of circular cross-section extending concentrically into the open end of said slidable tubular contact member, said mounting flange having on its other face an exteriorly threaded tubular bushing, the outer end of which being provided with an interior thread, a threaded spindle in threaded engagement with said interior thread and extending freely axially through said mounting flange and said tubular contact member thereon and through said slidable tubular contact member and being attached to the transverse wall thereof, one of said tubular contact members being provided with axially extending grooves and the other tubular contact member being provided with axially extending contact tongues integrally formed with said last mentioned contact member and slidably engaging the bottoms of said axially extending grooves to form an electrical connection, said tongue and groove connections also preventing a rotation of said slidable tubular member within said tubular member made of dielectric material.

2. A tubular condenser of variable capacity, comprising a tubular member of a dielectric material, a stationary electrode on the outer periphery of said tubular member, an axially slidable electrode within said tubular member opposite said stationary electrode, said slidable electrode having the form of a tubular piston, which is open at one end and is closed at the other end by a transverse wall, a mounting flange carrying on one of its faces said tubular member and being integrally formed with a contact sleeve of circular cross-section extending concentrically into said tubular member and into the open end of said tubular piston, said mounting flange having on its other face an exteriorly threaded tubular bushing, the outer end of which being provided with an interior thread, a threaded spindle in threaded engagement with said interior thread and extending freely axially through said mounting flange and said contact sleeve and being attached to the wall at the one end of said tubular piston, said contact sleeve being provided on its outer surface with axially extending grooves and the open end of said tubular piston being provided with contact tongues integrally formed with said tubular piston and slidably engaging the bottoms of said grooves to form an electrical connection with said contact sleeve, said tongue and groove connections also preventing rotation of said tubular piston within said tubular member when said threaded spindle is rotated.

3. A tubular condenser of variable capacity, comprising a tubular member of a dielectric material, a stationary electrode on the outer periphery of said tubular member, an axially slidable electrode within said tubular member opposite said stationary electrode, said slidable electrode having the form of a tubular piston, which is open at one end and is closed at the other end by a transverse wall, a mounting flange carrying on one of its faces said tubular member and being integrally formed with a contact sleeve of circular cross-section extending concentrically into said tubular member and into the open end of said tubular piston, said mounting flange having on its other face an exteriorly threaded tubular bushing, the outer end of which being provided with an interior thread, a threaded spindle in threaded engagement with said interior thread and extending freely axially through said mounting flange and said contact sleeve and being attached to the wall at the one end of said tubular piston, said contact sleeve being provided on its outer end which extends into said tubular piston with resilient contact tongues integrally formed with said contact sleeve, and the interior circumferential wall of said tubular piston being provided with axially extending grooves the bottoms of which are engaged by said resilient contact tongues to form an electrical connection, said tongue and groove connections also preventing a rotation of said tubular piston within said tubular member when said threaded spindle is rotated.

References Cited

UNITED STATES PATENTS 2,868,030  1/1959  Forwald.
3,263,140  7/1966  Lafer et al. -------- 317—249

FOREIGN PATENTS 768,410  2/1957  Great Britain.

LEWIS H. MYERS, *Primary Examiner.*

E. A. GOLDBERG, *Assistant Examiner.*

U.S. Cl. X.R.

74—424.8